United States Patent [19]
Martinez

[11] Patent Number: 4,928,177
[45] Date of Patent: May 22, 1990

[54] TWO-WAY DATA BROADCAST NETWORKS

[75] Inventor: Louis Martinez, Cerritos, Calif.

[73] Assignee: Cooper Industries, Inc., Houston, Tex.

[21] Appl. No.: 179,657

[22] Filed: Apr. 11, 1988

[51] Int. Cl.$^5$ .............................................. H04N 7/08
[52] U.S. Cl. ..................................... 358/142; 358/147
[58] Field of Search ............... 358/141, 142, 146, 148, 358/84, 147; 455/49, 51, 54, 57, 15, 5, 6

[56] References Cited

U.S. PATENT DOCUMENTS

| 4,454,538 | 6/1984 | Toriumi | 455/5 |
| 4,591,906 | 5/1986 | Morales Gorza | 358/84 |

FOREIGN PATENT DOCUMENTS

| 0103438 | 3/1984 | European Pat. Off. | 358/84 |
| 0033984 | 2/1984 | Japan . | |
| 0033985 | 2/1984 | Japan | 358/141 |
| 0147585 | 8/1984 | Japan | 358/142 |

OTHER PUBLICATIONS

Graf, Rudolf F., "Dictionary of Electronics", Fourth Edition, second printing, 1974, Howard W. Sams & Co., p. 591.

Primary Examiner—James J. Groody
Assistant Examiner—David E. Harvey
Attorney, Agent, or Firm—Roger W. Blakely, Jr.

[57] ABSTRACT

Forward link communication is achieved utilizing a conventional television broadcast station, either utilizing an entire presently unused TV channel or in a shared TV mode, with the return link communication being achieved using narrow band communication techniques for relatively low data rate communication through conventional television receiver aerials to a central receiver near the television station transmitter. The carrier reference of a local AM radio station is used as a synchronizing reference for the data streams and to allow the very close sepraration of each band in the return communication link to allow a large number of remote receivers to simultaneously communicate in the reverse link. Alternatively, the TV Chroma subcarrier serves this purpose.

9 Claims, 4 Drawing Sheets

TWO-WAY DATA BROADCAST NETWORKS

BACKGROUND OF THE INVENTION

1. Field of the Invention

The present invention relates to the field of digital data communication, and more particularly to wireless data communication to a plurality of subscribers or users in an interactive manner.

2. Prior Art

Various types of communication systems which include, at least in part, wireless data communication capabilities for communication to a large plurality of remote locations are known in the prior art. By way of example, in U.S. Pat. No. 4,117,405, a narrow band radio communication system is disclosed. In accordance with that disclosure, a narrow band system for communication between a transmitter device and a receiver device is provided by locking both devices to a carrier signal from a radio broadcast station and synthesizing a precise local frequency at leach device as a pre-set multiple of the frequency of the carrier. Such a system is usable in multi-station alarm and status communication including a multiplicity of independent radio alarm transmitters whose various carrier frequencies are different from, but phase locked to a local radio broadcast station, and a central alarm receiving station which employs a corresponding multiplicity of synchronized detectors. The detectors each have associated with them a synthesized local oscillator source which is also phase locked to the same radio broadcast station used by the alarm transmitters. Both the alarm transmitters and the central receiver are thereby accurately referenced to a readily available local frequency source, the broadcast station. As a consequence, very narrow band radio circuits may be employed and the receiver and transmitter band may be accurately matched to the information content of the alarm and status signal source to achieve high signal to noise ratio reliable transmissions. In U.S. Pat. No. 4,208,630, a narrow band paging or control radio system is disclosed which employs a similar synchronizing mechanism using a broadcast station for reference, though with the central transmitting apparatus transmitting signals to a multiplicity of remotely located receivers, which receivers may be used for paging purposes, or for controlling apparatus connected thereto.

The foregoing communication systems are generally directed toward the communication of identification codes, control signals, paging signals and the like of relatively limited information, but rather feature the capability of selective communication with any of a large number of remote receivers using the narrow band techniques disclosed therein. In other instances, it is desired to communicate large amounts of data to remote receivers so as to provide various types of information services for use in the home and by businesses alike. Such services may be either subscriber paid for, such as services which provide access to various types of data banks, electronic publishing or other information services, or services which are paid for by advertisers and the like, such as public transmission of catalogue and other advertising information.

Two types of services of this general type are known as videotex and teletex. Videotex uses the telephone line to provide two-way interactive communication so that the data requested by the user at the time is transmitted over the TV transmitter and/or the telephone line for display on the user's terminal or TV set. Such a system has the advantage of being interactive in that only the data desired by the user at the time need be transmitted, though it has the disadvantage of relatively low data communication rate capability if only the phone line is used in comparison to that normally desired, particularly in the forward mode, i.e., when communicating the requested data to the user. Teletex on the other hand is a one-way information transmission system using signals superimposed on television transmissions. The system has the advantage of high communication rate capabilities, though is highly limited because of the lack of interaction with the user. Consequently, usually teletex revenue is obtained mainly from advertisers as is customary in the television industry, while videotex revenues are expected to be derived primarily from subscribers. Obviously because of the advantages and disadvantages of each of these two systems, the nature of the information likely to be accessible over the two systems may be expected to be substantially non-overlapping, and accordingly both could be successful in the same geographic area. The purpose of the present invention however, is to provide a system having most of the advantages of both teletex and videotex in a single low cost system.

BRIEF SUMMARY OF THE INVENTION

Two-way data broadcast networks capable of taking advantage of the potentially very high data communication capabilities of conventional television broadcast stations and television receivers for the forward link are disclosed. For the return or reverse communication link, the plurality of receivers, each within the broadcast distance of both a local television station and a local AM radio station, each contain a local oscillator which locks onto the carrier of the AM radio station and generates therefrom a preassigned broadcast frequency for that receiver to transmit data to the television station at data rates also synced by the AM carrier frequency of the AM radio station. This television signal receiver and return transmitter is called the "subscriber terminal". Each subscriber terminal may transmit data in the form of information requests to the television station by transmitting on its preassigned frequency, modulated with a narrow band modulation in accordance with the information being transmitted. In this manner, each subscriber terminal may communicate in the reverse link through its own separate antennae. Each subscriber device transmits on its own preassigned narrow frequency band, allowing a very large number of subscriber terminals to simultaneously communicate Simultaneous reception and detection of a large number of subscriber terminal transmissions is enabled by the syncing of the subscriber terminal transmitters and an oscillator at the AM station to the TV station carrier (or subcarrier) frequency, with separation of the various receiver signals being accomplished at a central receiver through the use of a fast fourier transform computer, or by other techniques. On receipt of a request for data from a particular subscriber terminal, connection to the requested data source and very rapid transmission (e.g. 5.727272 million BPS as in present day Teletex during the vertical blanking interval) of the requested data is made to the requesting subscriber terminal through the television transmitter as in Teletex or Videotex Various embodiments and variations are disclosed.

DETAILED DESCRIPTION OF THE INVENTION

The present invention represents a marriage between commercial broadcast station resources and private radio to provide a bidirectional and thus interactive data communication system having a forward data communication rate of a number of orders of magnitude greater than can be achieved over a conventional telephone line, and a reverse link data communication rate which is adequate for most interactive applications, and which may be increased as may be necessary for other applications. The system is a relatively low cost system in that it takes advantage in large part of already installed equipment to minimize installation cost and time. In accordance with the invention, forward link communication is achieved utilizing a conventional television broadcast station, either communicating over the air or by cable, and either utilizing an entire TV channel or in a shared TV mode, with the return link communication being achieved using narrow band communication techniques for relatively low data rate communication through conventional television receiver aerials to receiver antennas located in the vicinity of the television station transmitter broadcast antennae. The carrier reference of a local AM radio station is used as a synchronizing reference for all the data streams and to allow the very close spacing of each subscriber terminal channel in the return communication link to allow a very large number of subscriber terminals to simultaneously communicate in the reverse link.

Figure 1:
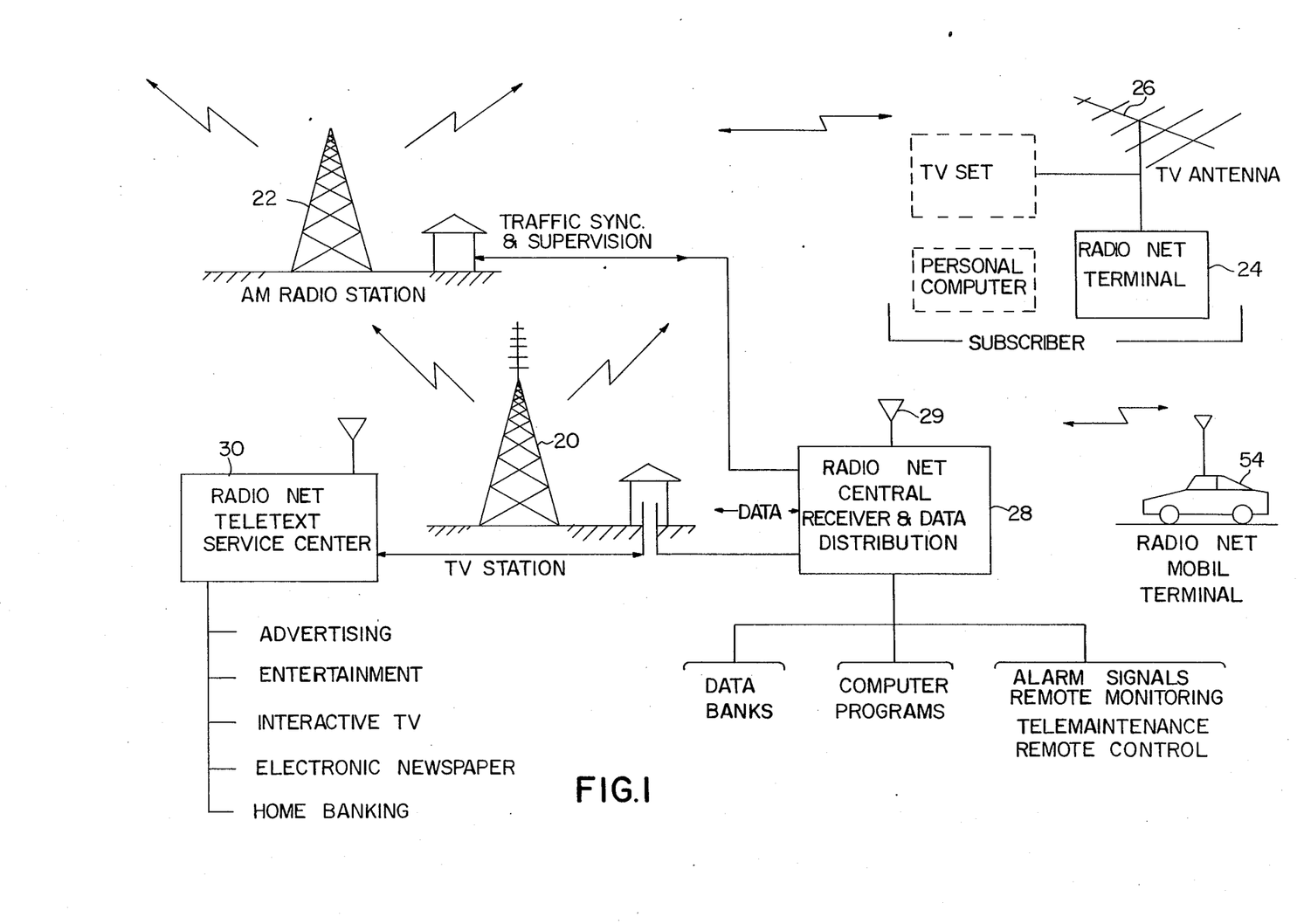
FIG. 1 is a block diagram of the radio net system of the present invention.

A basic system in accordance with the present invention may be seen in FIG. 1. The system, referred to by applicant as the "radio net system" or RADNET, utilizes a conventional television broadcast station 20, a conventional AM radio broadcast station 22 and a plurality of subscriber terminals 24 coupled to conventional television antennaes 26, which may be installed at the subscriber's home, business or the like, or otherwise available as a portable antennae. A central receiver and data distribution center 28 provides overall orchestration of the system, in part by providing traffic synchronization and supervision signals to the AM radio station 22 for broadcast to the terminals 24 to provide synchronization and supervision signals thereto. Such signals may include, in addition to the fundamental frequency reference, time reference signals to identify time windows within which various functions can or will occur, subscriber identification codes to momentarily enable reception by one or more selected subscribers, transmission data content identification to allow subscriber selected reception of advertiser paid materials, mode control signals to enable various terminal modes such as immediate display, memory storage or VCR storage, etc.

For one-way teletex type services, a radio net teletex service center 30 is used to originate broadcasts comprising advertising, entertainment, interactive TV, electronic publishing and the like, for reception by the subscriber. In the case of advertising, or advertising paid entertainment, all subscribers may be enabled so that a subscriber may selectively receive whatever advertising or entertainment is desired. In this regard, it should be noted that while the present invention is primarily intended for data communication, the inclusion of a stop frame video recorder at a radio net terminal will allow the transmission and reception of pictures (analog) also, so that catalogues which include both product pictures and textural materials regarding product description and prices may be efficiently transmitted during off peak hours for storage and latter display by RADNET subscribers. Other teletex type data such as electronic newspaper and other electronic publishing is made code or address dependent or otherwise encrypted so that only subscribers for that particular publication may receive and display the transmission. Here again, while the present invention is principally intended for data communication, both text and pictures may be transmitted, the text preferably, but not necessarily, transmitted in data form.

For two-way videotex type services, a return link communication system is required. Communication in this direction may generally be quite slow, as bulk data is not normally desired to be transmitted, but rather only specific data requests, short responses, etc., are required. By way of specific example, the request for access to specific data within a specific data bank may only require the transmission of a very brief digital message. For instance, a request for stock market information and a specific stock quote would only require the identification of the stock market data bank, the specific stock information requested, and the specific quote requested, all of which requested information may be menu-driven at the radio net terminals 24, with the actual data bank identification, etc., being transmitted in abbreviated or coded form. For this purpose an unused television channel is preferably broken up into a large number of very narrow frequency subchannels so that simultaneous transmission from a plurality of radio subscriber terminals 24 back to the TV station 20 may occur without interference between channels. By way of example, if a number of reverse link subchannels are created, each 200 hertz wide, then theoretically 30,000 such channels may be established in the 6 megahertz bandwidth of an unused television channel. Communication from subscribers to the central receiver antenna 29 near the TV station antennae is possible in part due to reciprocity, that is, if the TV station broadcast antennae can provide a signal for good reception by the TV antennae of an individual subscriber, then the individual subscriber can transmit (providing the transmission power density is sufficient) to an antenna in the vicinity of the TV station antennae. With respect to the question of power, a signal on the order of a few watts may readily be radiated by a subscriber TV antennae which signal, on a power per cycle of bandwidth, is on the same order as or higher than the signal typically broadcast by TV stations. Thus, assuming very high selectivity in the reception and demodulation of the return link signal, a high quality reverse communication capability may be provided. It should be noted further that TV station broadcast antennaes are normally positioned on high terrain to provide maximum line-of-sight communication with receiver antennaes, which in turn are purposely positioned and oriented for best reception. Such a configuration automatically maximizes the capability of communication in the return link, and for that matter minimizes the likelihood of interference with neighboring TV stations, as a subscribers TV antennae normally will be relatively low in comparison to the associated TV station antennae and thus poorly oriented and positioned for transmitting but very local TV stations, all of which will be sufficiently separated in frequency to not interfere with each other.

The system of the present invention may also be advantageously used for the promotion and sale of software. In particular, a subscriber terminal may be used as a computer terminal, with the user receiving software promotional material, and being able to "use" the software on a demonstration basis by the users entry of his own data and receiving the processed and formatted data on an interactive basis without actually having the software in the terminal. Upon his decision to buy the software, he may transmit his order and credit card or credit information over his preassigned return link channel, after which the entire software package would be encrypted by a password known only to the user or his terminal, and transmitted to the user over the forward link.

If the password is, at least in part, part of the software purchase order transmitted over the return link, piracy of the software from the forward link transmission by others, while perhaps possible, would be most difficult and impractical because of the special equipment required to listen to any return link transmission and the uncertainty in the time and channel of any such transmission. Obviously software or other items may be sold and delivered this way, or delivered through the mail or by other delivery services. Even if the delivery of the software were by mail, the ability to "demonstrate" the software in the customer's home, on his own equipment and at his leisure is a tremendous advance in marketing technique.

Figure 2:
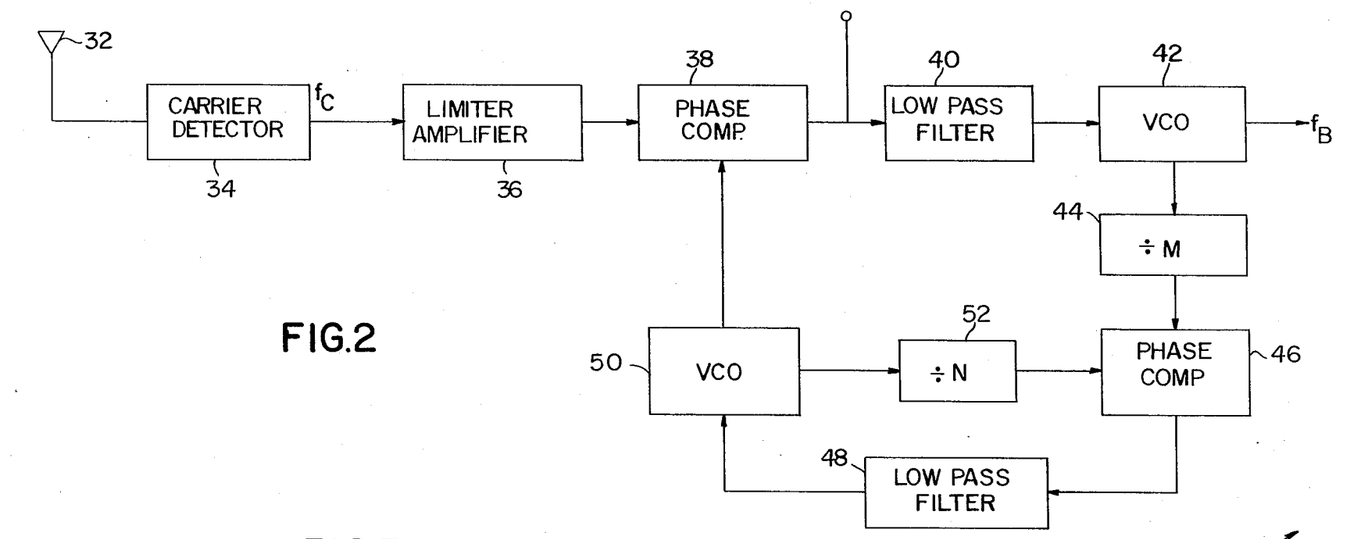
FIG. 2 is a block diagram of a frequency synthesizing circuit for use with the present invention.

A method of generating the frequency and time references for each band for the reverse communication link, both at the RADNET terminals 24 of the various subscribers and at the central receiver 29 near the TV station is illustrated in FIG. 2. In accordance with this figure, an antennae 32 which may be a simple ferrite antennae or a TV antennae, provides a signal to a narrowly tuned carrier detector circuit 34 locked to the carrier of a local AM radio station 22 (FIG. 1) to provide an output equal to the carrier frequency $f_c$ in response thereto. For illustrative purposes, assume for the moment that the AM radio station has a carrier frequency of 640 Khz, and accordingly the frequency $f_c$ will be the carrier frequency of 640 Khz with the side bands removed therefrom. The carrier frequency is then preferably passed through a limiter amplifier 36, essentially amplifying and clipping the carrier frequency to provide a square wave output to the phase comparator 38 to emphasize the position of the zero crossings and de-emphasize the amplitude the output of the carrier detector 34. The output of the phase comparator 38 is passed through a low pass filter 40 and applied to a voltage controlled oscillator 42. The output of the voltage controlled oscillator is divided by a factor M by the divide circuit 44, and applied to another phase comparator 46, the output of which is filtered by low pass filter 48 and used to control the voltage controlled oscillator 50, the output of which provides the second input to the phase comparator 38. Thus, when the circuit of FIG. 2 is locked onto the AM broadcast station carrier, the output of voltage controlled oscillator 50 will be equal to the carrier frequency. The output of the voltage controlled oscillator 50 is divided by a factor N by the divide circuit 52 to provide the second input to the phase comparator 46. For the specific example being described, if N is 3,200, then for the 640 Khz carrier, the input to the phase comparator 46 from the divide circuit 52 will be 200 hertz. Obviously the other input to the phase comparator 46 from the divide by M circuit 44 will also be 200 hertz, or stated otherwise, the output of VCO 42 will be exactly 200 M times the carrier frequency $f_c$ of the AM radio station. Obviously incremental steps in the value of M cause incremental steps in the output frequency $f_c$ of 200 hertz.

Assume for the moment that channel 18 was to be used for data communication in accordance with the present invention, and that only the 4 megahertz band width of the picture upper side band is to be used. The frequencies $f_c$ would range from 495.25 megahertz to 499.25 megahertz. Similarly for the return link, the values of M associated with individual transmitters at subscriber radio net terminals and associated with the corresponding channel to be demodulated after reception at the TV station would range from 4,952,500 to 4,992,500, thereby effectively defining 20,000 channels over the 4 megahertz bandwidth. Obviously the 200 hertz width of each channel could be made larger or smaller depending upon the desired communication rate, though it is believed desirable to select a relatively low rate usuable for general purposes, and to assign multiple channels to a given terminal for those applications where the communication rate for a single channel for that terminal is not adequate. By way of example, assignment of 200 Hertz subchannels to a given subscriber terminal would allow communication of 75 ASCII characters per second together with a parity bit for each character, and leave a 50 Hertz guard band.

The advantage of using a circuit such as that of FIG. 2 for establishing the assigned channel frequency or frequencies at each terminal, and for establishing the channel frequency of each subchannel being received at the central receiver 28, is that both locations are generating the same frequency using the same reference, so that a slight variation of the carrier frequency of the AM radio station over a period of time will be exactly tracked at both locations. In that regard, by requirement AM carrier signals stay within a very few hertz of the preassigned carrier frequency so that the frequency wander will be highly limited in any event. Further, this also means that the circuit of FIG. 2 must only capture and lock onto the AM radio broadcast carrier frequency within a very limited band so that the low pass filters 40 and 48 may have a significant time constant, which in turn will provide a "coasting" effect in the event of momentary dropouts of the received AM carrier signal due to interference, short term signal reflections, etc. This of course has advantages in any situation, though may be particularly advantageous in the case of mobile terminals such as the mobile terminal 54 illustrated in FIG. 1, which could be used by way of example by police to gain immediate access to Department of Motor Vehicle data banks, etc.

Figure 3:
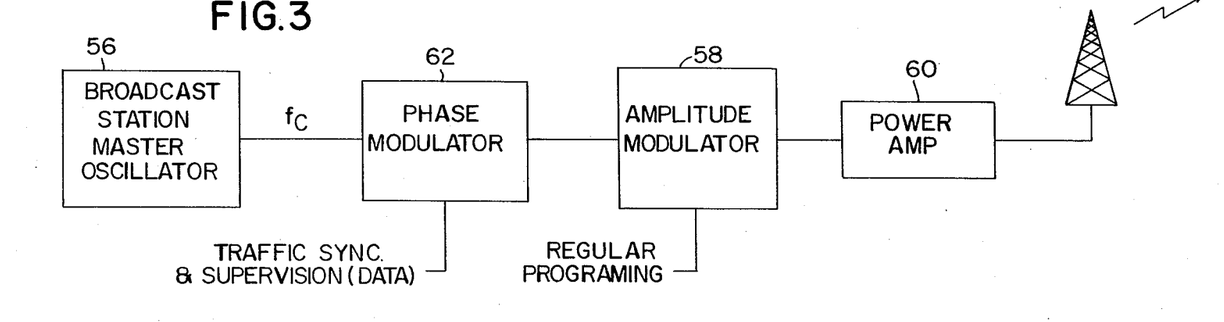
FIG. 3 is a block diagram illustrating the modification required in a conventional AM radio station to use with the present invention.

Now referring to FIG. 3, a typical AM radio broadcast station 22 (FIG. 1) used with the present invention may be seen. As with all AM radio broadcast stations, a master oscillator 56, an amplitude modulator 58 and power amplifier 60 driving the antennae may be found. In addition however, between the master oscillator 56 and the amplitude modulator 58 is a phase modulator 62 which provides small angle phase modulation of the carrier in accordance with the traffic sync and supervision signals, typically digital signals applied thereto, from the radio net central receiver and data distribution office 28 (FIG. 1). The modification which must be made to a standard AM broadcast station in order for the station to function with the present invention is relatively minor, as the phase modulator 62 operates at master oscillator signal levels rather than high power levels and may readily be inserted between the master oscillator and the amplitude modulator without any other modification to the broadcast station. The modulation of the carrier will still keep the carrier frequency within FCC requirements if the carrier is modulated at a subaudible rate with a phase shift of plus or minus 15 degrees. By making the phase shift plus 15 degrees followed by a shift of minus 15 degrees for the transmission of a mark or one, and no phase shift for the transmission of a space or zero, the average carrier frequency is not disturbed by the modulation and the side bands created by the carrier are sufficiently narrow to stay within legally prescribed limits of the nominal carrier frequency, and are undetectable by way of conventional AM mono or stereo radio receivers. Further, the positive phase shift followed by a negative phase shift (or vice versa if preferred) occurs sufficiently rapidly to be essentially transparent to the frequency synthesizing circuit of FIG. 2 operating from the received (and thus the phase modulated) AM carrier. In that regard, while the data transmission over a conventional TV channel of 6 megahertz bandwidth may be on the order of one megabit per second or higher, a plus or minus 15 degree inaccuracy in following the AM radio station carrier for a 640 Khz radio station would represent less than a 30 degree bit sampling error at a one megabit per second bit rate. Such an error is clearly tolerable in accurately sampling a bit stream for detecting the bits therein, and accordingly the circuit of FIG. 2 may readily be used to synchronize the bit stream at the transmission and reception ends of the forward communication link so that longer data streams can be transmitted between start and stop bits than would be possible if the transmitter and receivers operated on separate clocks, thereby grossly reducing the synchronizing overhead required and increasing the efficiency of the data transmission.

Figure 4:
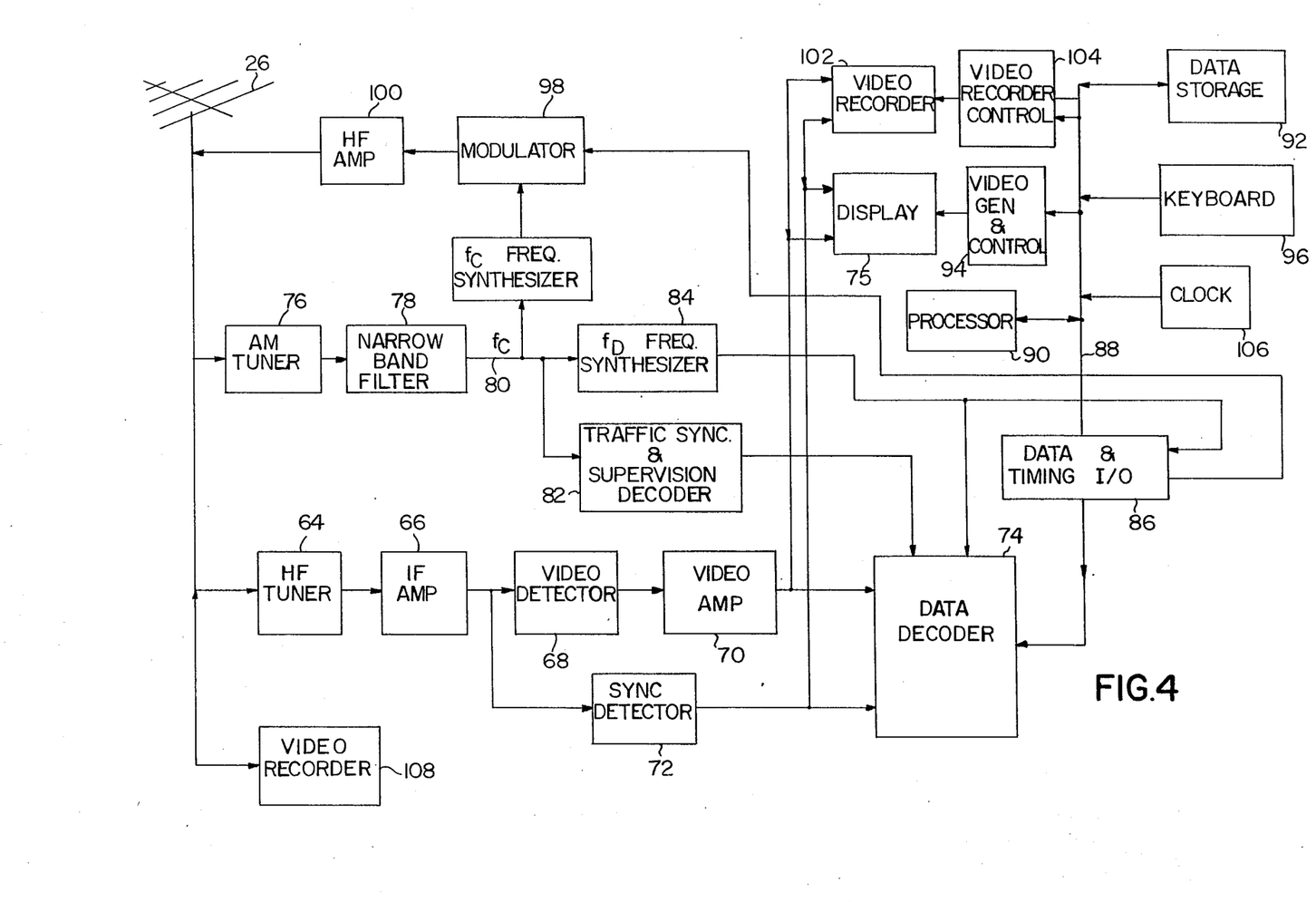
FIG. 4 is a block diagram of one possible form of radio subscriber terminal and, FIG. 5 is a block diagram of an alternate form of radio subscriber terminal.

Now referring to FIG. 4, a block diagram of one possible configuration for the radio subscriber terminals 24 (FIG. 1) of the present invention may be seen. In FIG. 4, the television antennae 26 is coupled to conventional RF and video circuits comprising a high frequency (VHF or UHF) tuner 64 and intermediate frequency amplifier 66 driving a video detector 68 and video amplifier 70, and also driving a sync detector circuit 72. These circuits of course provide conventional video and video sync signals which may be used to drive a conventional black and white or color video display 75, these circuits and display essentially comprising a conventional television receiver. For data reception in the forward link, the output of the video amplifier 70 will provide base band data information to a data decoder 74 which is synced in part by the sync detector circuit 72. The bit stream, of course, corresponding to any horizontal sweep line could be transmitted in the "vertical blanking interval" as in Teletex, and could be synced by conventional techniques using start and stop bits and a locally generated block signal. However, as previously described, it is preferable to connect the AM tuner 76 either to the television antennae 26 or alternatively to a ferrite antennae and to provide a relatively narrow band filter 78 on the carrier frequency of a predetermined AM station to provide the AM radio station carrier on line 80, as phase modulated by the traffic synchronization and supervision signals. (The AM carrier frequency itself could be locked to the TV chroma subcarrier, for reasons which will be subsequently described. ) These signals in turn are decoded by a phase demodulator 82 and used by the data decoder 74 as control signals thereto. The carrier frequency on line 80 is also passed through a frequency synthesizer 84, generally constructed in accordance with the circuit of FIG. 2, to provide a timing reference frequency for the data bit stream transmitted through the television channel using the same form of reference. In that regard, the frequency $f_c$ provided by the circuit of 84 may be set equal to the data rate or at some multiple of the data rate and then counted down in the data decoder 74 starting at the mid-point of a start bit to provide near mid-bit sampling of the following data stream. The serial bit stream is assembled by the data decoder 74 into eight bit bytes and passed through a data and timing I/O interface to a microprocessor based system bus 88, as controlled by a microprocessor 90. The microprocessor 90 will receive data in byte form from the data and timing I/O circuit 86 and store that data in data storage unit 92, which normally will include random access memory sufficient to store a number of pages of display information and which may include tape or disk storage or other bulk data storage of relatively large quantities of information. Typically, for display purposes, a video generator and control circuit 94 is used to generate the required video sync signals and provide timing and alphanumeric character generation to appropriately convert digital data presented thereto to appropriate alphanumeric display information for the various sweep positions of the raster of the display 75. As is done in some microprocessor based systems such as in Apple II computers, counter circuitry in the video generator circuits operating off of the same clock reference as the microprocessor may provide the addressing to random access memory and to the alphanumeric character generator as well as the video sync signals required for operation of the display system utilizing the processor on a 50 percent duty cycle for display refresh purposes, so that the other 50 percent of the time the processor is available for any other tasks assigned thereto such as data input, output, etc. Of course, the overall system is controllable through a conventional keyboard 96 to carry out the various functions of the system.

In a Teletex type mode, requests for information entered through the keyboard 96 may be temporarily accumulated into partial or complete requests by the microprocessor in the data storage 92 and then passed by the microprocessor to the data and timing I/O circuit 86 to be passed serially in digital form to a phase modulator 98. This serial bit stream is also preferably synchronized using a reference also accessible at the television broadcast station so that the bit stream being transmitted by each terminal would be synchronously detected once that channel has been demodulated. While such synchronization is not mandatory, it can be provided by synchronizing the AM carrier to the TV Chroma subcarrier and is advantageous to increase the efficiency of the return link communication by cutting down on the required synchronization overhead. For such synchronizing purposes even the 60 hertz power line could be used, but preferably a reference frequency derived from the AM radio station carrier in the aforesaid manner may be used. Thus as shown in FIG. 4, the output of the frequency synthesizer 84 is used not only for forward link data synchronization but also is counted down by the data and timing I/O circuit 86 to provide the relatively low frequency reference for the data stream of the return link. The output of modulator 98 of course is amplified by the amplifier 100 to provide a broadcast signal to the antennae 26, preferably on the order of 2 watts. As previously described, the phase modulation provided by modulator 98 is limited to a small angle phase modulation, with the data rate itself being limited to approximately 75 bits per second so as to keep the bandwidth of the signal broadcast by the return link within the preassigned channel limits, centered on the preassigned frequency of that channel.

While the serial data rate in the forward link may be relatively high (on the order of a megabit per second or higher) the data once assembled in byte form may readily be received and processed on-line by conventional microprocessors such as microprocessor 90 and stored in limited random access memory in data storage unit 92, which normally will be adequate when operating in a Videotex mode as normally a subscriber will be asking for and receiving specific limited information at any one time. However, in the typical Teletex mode, large amounts of data may be received such as newspapers, catalogues and the like, which for practical reasons would exceed that which may be readily stored in a reasonable size random access memory. Accordingly, for this purpose, a video recorder may be provided such as video recorder 102 operative under control through the keyboard 96 and microprocessor 90 through the video recorder control circuit 104, either in an immediate response mode or as controlled by clock 106 for operation in accordance with a programmable schedule. The video recorder 102 as shown of course is bilaterally operable from the video and video sync signals of the video amplifier 70 and sync detector 72 so as to be usable to record incoming signals in bulk and later play back parts of those signals if desired for processing through the data decoder 74 as if then being received.

Currently conventional video recorders usually include their own tuner, etc., so as to connect directly to a TV antennae to provide the capability of recording one program while the conventional TV receiver is used to view another program. As such a conventional recorder such as recorder 108 may also be used if desired to record directly off of the antennae signal and to play back portions of the tape for viewing under manual control of the user.

It will be appreciated on review of FIG. 4 that substantially all of the analog video circuitry and display is characteristic of conventional television receivers and that the digital circuitry is characteristic of conventional personal computers, using in addition of course some additional specialized circuits such as the data decoder 74 to characterize the personal computer for this particular function. The remaining synchronization and return link communication capabilities are achieved by specialized, though relatively low cost circuitry so that the entire function of the radio subscriber terminal may be readily achieved with a conventional TV set, a personal computer and some additional communication circuitry, together with a conventional video recorder if desired.

Figure 5:
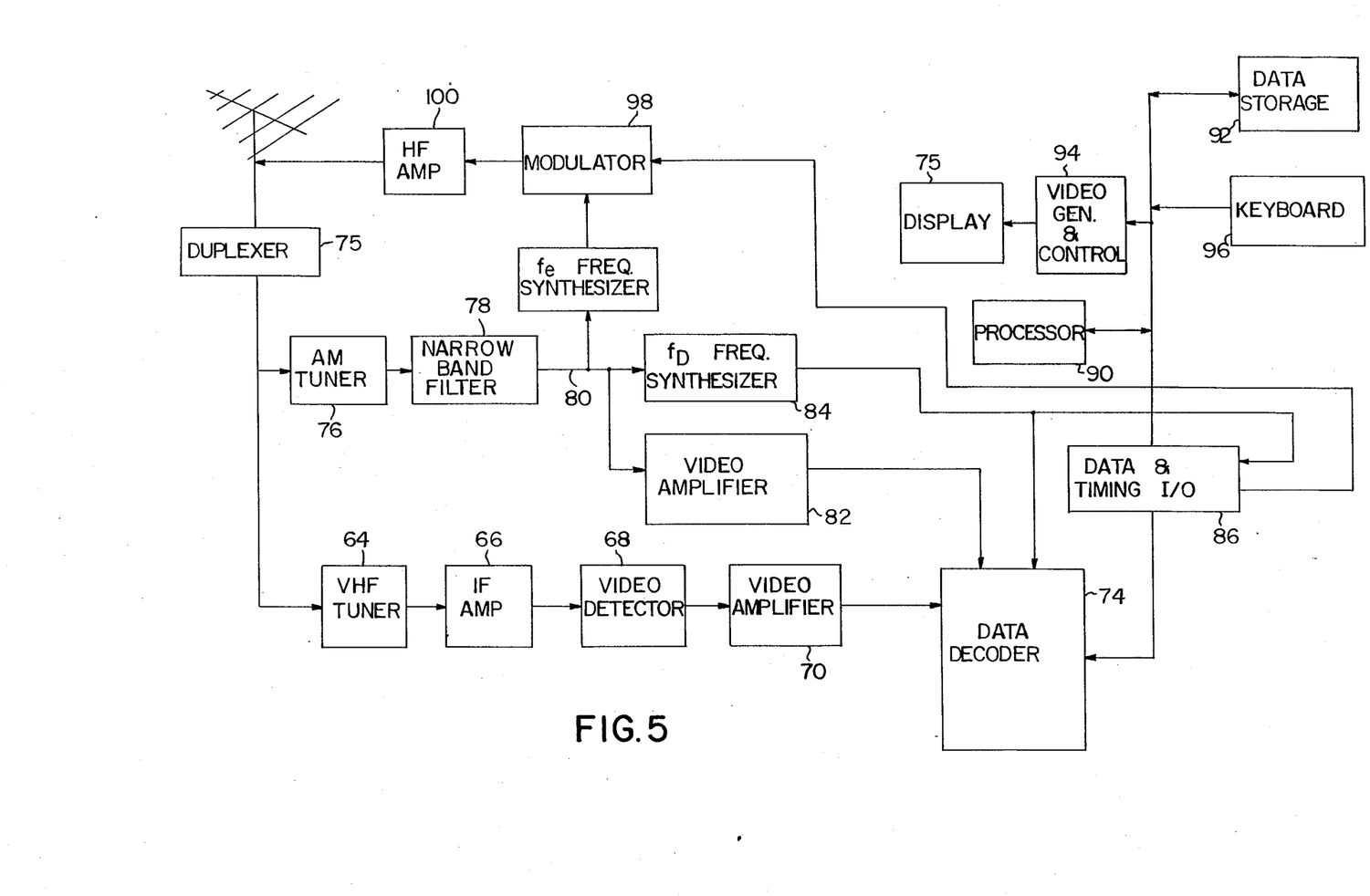

Now referring to FIG. 5, a block diagram for an alternate radio subscriber terminal configuration may be seen. This embodiment is the same as that shown in FIG. 4 with the exception that horizontal and vertical sync signals for the video signal are not transmitted. Such a configuration has the advantage of not having to time share the television channel between data and sync signals and of simplifying the radio subscriber terminal, though of course has the disadvantage of no longer enabling the use of a video recorder or the display of anything other than digital data in alphanumeric character form. Also such a configuration does not have any special advantage if the system is being used on a time shared basis (in the nonviewable lines) with conventional TV broadcasts, as horizontal and vertical sync signals are being broadcast anyway. In that regard one of the advantages of the present invention is that ability to use the system with conventional or substantially conventional television receivers which can be used as such when not being used as a radio subscriber terminal. In this manner, the incremental cost to provide a radio subscriber terminal in a home already having a conventional television set, and particularly having both a television set and a personal computer would be very low in comparison to competing systems.

The embodiments heretofore described have utilized the carrier of a local AM radio station for synchronization and supervision of the communication system. While this has certain advantages, particularly for mobile subscriber terminals to minimize multipath problems, it is not a necessary limitation in the present invention. In particular, one might choose to have both the data and synchronization and supervision signals transmitted through the television station using, for example, the TV Chroma subcarrier as prescribed later, or any of a number of techniques. By way of example, the video intensity portion of a conventional television broadcast signal is placed on an RF carrier using amplitude modulation (AM) techniques The "color" portion is placed on the Chroma subcarrier. In particular each television channel is approximately 6 megahertz wide, with a picture signal carrier being 1.25 megahertz above the lower end of the band (in general, while an approximately 4 megahertz wide upper sideband is transmitted, the lower sideband is truncated approximately 1 megahertz below the carrier frequency). The Chroma subcarrier is at 3.579545 MHz. Thus a black and white picture signal carrier may be phase modulated with the synchronization and supervision signals using narrow band phase modulation techniques as described. As disclosed in my prior U.S. Pat. No. 4,117,405 (see also my prior U.S. Pat. No. 4,208,630) by using small angle low frequency phase modulation of an AM carrier, the carrier frequency deviation may be maintained within predetermined limits, and conventional AM detectors will be insensitive to the modulation. The technique of course is exactly as described with respect to the modulation of the carrier of an AM radio broadcast station in the previous described embodiment of the present invention, though the parameters may be somewhat different because of the higher frequencies of the video carrier and the different characteristics and sensitivities of video receivers. In any event the block diagrams such as those of FIGS. 2 through 5 are directly applicable, whether the AM tuner is responding to the video carrier or the AM broadcast station carrier.

Another approach, if the TV station is sending only a black and white picture, is to use the RF carrier or Chroma subcarrier on the television signal for synchronization and supervision purposes instead of or in addition to using the AM broadcast station. (Syncing the AM carrier to the Chroma signal and detecting both at subscriber terminals for synchronization purposes, particularly for the return link transmissions from mobile terminals, has the advantage of being able to maintain sync even on dropout of one of the two reference signals, so that even if data communication is temporarily interrupted, word sync, frame sync, etc., will not be lost and therefore need not be reestablished. Also syncing on the stronger of the two references provides a better sync, allowing the best data detection and recovery possible.) In accordance with this technique a frequency (i.e., 3.579545 MHz) is selected within the picture signal bandwidth, with that frequency being phase modulated at a predetermined and limited extent with small angle phase modulation in accordance with the synchronization and supervision signals to be transmitted. Such modulation may be limited to only the TV vertical blanking interval, or when sending only black and white TV signals. Accordingly the bandwidth of the phase modulated subcarrier may be appropriately controlled so as to not significantly reduce the bandwidth available for data communication purposes in a manner similar to present color TV transmission. In such a case, the AM tuner 76 of FIGS. 4 and 5 would also include a detector with a narrow band filter 78 of these Figures being centered on the subcarrier frequency for detection both of the frequency itself for use by other frequency synthesizers and for the detection of the phase modulation thereof to strip out the synchronization and supervision signals. As a further alternative, one might choose the subcarrier frequency to be 4.5 megahertz, the frequency on which the audio portion of a conventional television signal is frequency modulated. This leaves the full picture frequency band available for data transmission and relatively well isolates the carrier, making the audio carrier and phase modulation detection thereof more easily detected. Yet another alternative is to use a separate inaudible subcarrier on an audio transmitter, such as an FM transmitter as described in my patent application entitled FM Communication System, filed Mar. 29, 1982 as Ser. No. 362,888.

As previously mentioned, the system of the present invention may be used for one way or two way communication during the non-viewable portion of a conventional television transmission (the vertical blanking interval), or may be used with a television channel devoted to such transmission or at least available for such transmission during normally off hours. In such event, it is desirable to provide a capability of receiving ordinary television programming on a conventional television receiver and simultaneously transmitting and receiving information through a radio subscriber terminal (and perhaps a conventional television receiver for display purposes) utilizing the subscriber's existing television antennae. In particular, it is not uncommon in a private home to have two or more television receivers connected to the same antennae, with the receivers being used simultaneously to receive the same or different programming in different rooms of the dwelling. If at certain times one of the two or more receivers is to be used as part of a radio net terminal, it is desirable to be able to do so (or to use a radio net terminal of any configuration) on the antennae. A potential problem exists however, when communicating from the radio net terminal to the radio net central receiver 28. This problem could be overcome however, using duplexer 75, by effectively duplexing the antennae of the subscriber so that simultaneous transmission and reception on a single antennae may be achieved. Such duplexing depends upon the frequency separation between the signals to be received and the signals to be simultaneously transmitted. In particular, the high frequency amplifiers 100 of FIGS. 4 and 5 may be made highly frequency selective so as to provide a low impedance drive to the antennae in the very limited frequency range within which transmission is desired and to otherwise not significantly load the antennae line. As such, signals of other well seperated frequencies such as ordinary programming, may readily be received on the same antennae during transmissions from the radio net terminal back to the television transmitter antennae. In that regard, such duplexing is not difficult in that the power being transmitted by the subscriber is relatively low anyway, transmission from the radio net terminal back to the central receiver antennae 29 being facilitated not by the absolute power level, but rather by the relatively high power per unit bandwidth facilitated by the very small bandwidth of such subscriber transmissions.

As previously discussed, up to 30,000 simultaneous subscribers may be accommodated on a single television channel utilizing a 200 hertz bandwidth per subscriber. In certain instances however, it may be desired to accommodate more than 30,000 subscribers, as many television stations serve much larger urban areas. This may be readily accommodated by recognizing that even at peak periods of use, probably only a small fraction of the radio subscriber terminals served will be in use at any one time. Obviously if two or more radio subscriber terminals are assigned the same transmission frequency there may be times when more than one terminal is desired to be used. In general however, requests for information will not be entered at the terminal at the full transmission rate capability for any significant length of time, so that packet switching may be used whereby full request messages or substantial portions thereof are saved at the terminal and then transmitted at the maximum possible rate, thereby allowing the interleaving of users on the same channel as regulated by the overall synchronization and supervision protocol. Further, the return data rate is so high (5.72 MBPS as in Teletex) that the information provided normally must be at least somewhat digested before a subsequent request for further or different information is likely forthcoming from the same radio subscriber terminal. This too allows interleaving of a number of users on the same channel. Alternately, subscriber terminals may be assigned to a vacant subchannel by the central receiver 28 on real-time basis depending on traffic.

Finally, radio subscriber terminals and transmission frequencies thereof may be grouped so that a plurality of radio net terminals can share a lesser plurality of transmission channels. By way of example, 32 radio net terminals might share four adjacent communication channels with any radio net terminal being able to transmit on any of the four channels dependent upon the availability of the channels. In such a system a radio net terminal could not be identified by its transmission frequency but rather would be identified as one of 32 when using any of the four frequencies. However, a simplified five bit identification code may readily be transmitted prior as part of a message so that which of the 32 radio net terminals is transmitting can readily be determined from the signal received by the central station antennae. Obviously such a system requires that there be a method of indicating when a particular channel is busy though such information may readily be maintained and updated at the radio net central office and data distribution center 28 (FIG. 1) with updates being periodically broadcast. In that regard, such information could readily be broadcast every two seconds, by way of example, without significantly reducing the data communication rates whereby the average wait for a communication subchannel from a radio net terminal to the central office is only one second, far less than is required to place a phone call and sufficiently short to not be objectionable in an interactive system. Such a system would also require that each radio net terminal transmitter would have to be capable of changing its broadcast frequency as commanded between any one of the adjacent four channels. This is easily accomplished with the preferred embodiments of the present invention, however, through the control of the divide by M circuit 44 (see FIG. 2). In particular the divider circuit 44 could be realized as a digital circuit which is set with a predetermined number M and then counted down (or up), being reset to the predetermined number upon the generation of a carry. The value of M may readily be controlled to provide a frequency within any one of the four adjacent channel by having the least two significant digits of the "predetermined" value of M under control of the synchronization and supervision signals.

There has been disclosed herein a new and unique bidirectional communication system, particularly suited for use both as a videotex type terminal and teletex type terminal, having very high data rates in the forward communication link and lower but adequate communication rates in the reverse link. From the description given herein, it will be obvious by those skilled in the art that various changes in form and detail may be made therein without departing from the spirit and scope of the invention. For example, the use of a synchronized Fast Fourier Transform (FFT) processor in the control receiver 28 for return link data recovery will be apparent from the foregoing description and my U S. Pat. No. 4,322,842.

I claim:

1. A two-way data broadcast network comprising;
an AM radio station for transmitting a carrier signal;
a television station;
digital data means coupled to said television station for providing digital data thereto, said television station including means for producing a television signal corresponding to at least one television channel, at least part of said television signal containing said digital data;
first communication means for communicating said television signal to a plurality of remote locations;
a plurality of remote terminals for receiving said television signal and for recovery of said digital data,
said digital data means and each of said plurality of remote terminals including means for receiving said carrier signal and developing a timing reference signal therefrom to synchronize the digital data in said television signal of said television station and the recovery of said digital data by said remote terminals;
each of said plurality of remote terminals having means for generating at least one of a predetermined plurality of non-overlapping narrow band communication channels referenced to said carrier signal;
each of said plurality of remote terminals further having means for modulating said at least one narrow band communication channel with a data signal;
second communication means for simultaneous communication of a plurality of said narrow band modulated signals, each in one of said narrow band communication channels, to a central location; and
recovery means coupled to said central location for receipt and detection of each of said data signals.

2. The broadcast network of claim 1 wherein said first and second communication means comprise a common bidirectional cable.

3. The broadcast network of claim 1 wherein said first communication means includes a television broadcast station antenna for broadcasting said television signal, each of said remote terminals having a receiver antenna.

4. The broadcast network of claim 3 wherein said second communication means includes a central receive antenna, and a television signal receiver antenna at each said remote terminal, whereby narrow band modulated signals may be transmitted in narrow band communication channels through one of said television signal receiver antennas and received by said central receiver antenna of said second communication means.

5. The broadcast network of claim 4 wherein said first communication means and said second communication means operate on a time shared basis, whereby said first communication means and said second communication means are operative at different times.

6. The broadcast network of claim 4 wherein said first and second communication means are operative in different frequency bands.

7. The broadcast network of claim 1 wherein said first communication means includes a television broadcast station antenna and is a means for communicating said television signal in a preassigned television broadcast channel.

8. The broadcast network of claim 7 wherein said television signal includes horizontal and vertical signals.

9. The broadcast network of claim 8 wherein said television signal includes regular television programming, and wherein said digital data is contained in the nonviewable lines of the video signal.

* * * * *